United States Patent [19]

Cox et al.

[11] 4,345,956

[45] Aug. 24, 1982

[54] METHOD FOR MAKING A PIPE CONNECTION OR FITTING

[75] Inventors: Russell C. Cox, Taylors, S.C.; Arthur H. McElroy, Tulsa, Okla.

[73] Assignee: Phillips Petroleum Company, Bartlesville, Okla.

[21] Appl. No.: 140,901

[22] Filed: Apr. 16, 1980

[51] Int. Cl.$^3$ .................. B29C 17/08; B29D 3/00; B29D 9/00

[52] U.S. Cl. .................. 156/198; 29/451; 156/196; 156/252; 156/293; 264/152; 264/154; 264/237; 264/249; 264/250; 264/292; 264/296; 264/322

[58] Field of Search ............... 264/230, 138, 152, 154, 264/229, 232, 239, 241, 249, 250, 267, 274, 292, 296, 340, 234, 237, 320, 345, 322; 29/451; 156/196, 198, 252, 293, 294

[56] References Cited

U.S. PATENT DOCUMENTS

| | | | |
|---|---|---|---|
| 548,998 | 10/1895 | Mannesmann | 285/150 |
| 1,382,049 | 6/1921 | Aspinwall | 285/22 |
| 2,266,611 | 12/1941 | Martin et al. | 285/204 |
| 2,515,899 | 7/1950 | Sanger-Stevens | 285/302 |
| 3,687,492 | 8/1972 | Leopold et al. | 264/249 |
| 3,953,059 | 4/1976 | Caroll et al. | 264/230 |
| 3,989,282 | 11/1976 | Zimmerman | 285/192 |
| 4,036,514 | 7/1977 | Hannover | 264/230 |

Primary Examiner—Willard E. Hoag

[57] ABSTRACT

A first pipe is connected to the wall of a container such as a larger pipe, tank or other vessel, wherein the transverse surface of one end of the first pipe is substantially flush with the inside surface of the portion of the wall of the container to which the first pipe is connected. The method for forming the pipe connection relies upon the plastic memory of the synthetic thermoplastic polymeric material from which the end portion of the first pipe and the portion of the wall of the container, to which the first pipe is to be connected, are formed. The diameter of a hole in the wall of the container is expanded in a cold condition in such a manner that the edges of the hole expand outwardly from the wall of the container while the diameter of the end portion of the first pipe is reduced in a cold condition such that the reduced diameter portion of the first pipe can be inserted into the expanded hole. The plastic memory of the synthetic thermoplastic polymeric material from which the end portion of the first pipe and the wall of the container, to which the first pipe is to be connected, are formed causes a tight connection to be formed.

5 Claims, 6 Drawing Figures

METHOD FOR MAKING A PIPE CONNECTION OR FITTING

This invention relates to a pipe connection and a method for making a pipe connection. In a particular aspect this invention relates to a connection between a first pipe and a container such as a larger pipe, tank or other vessel, wherein the transverse surface of the connected end of the first pipe is substantially flush with the inside surface of the portion of the wall of the container to which the first pipe is connected, and a method for making the connection between the pipe and the container.

As used herein, the term "plastic" is utilized to refer to a synthetic thermoplastic polymeric material. A pipe formed from such a material may be connected to a container such as a larger pipe, tank or other vessel in a number of ways. Where the container is also plastic, the pipe is commonly welded to the container. However, this method of connecting a plastic pipe to a plastic container is difficult when the pipe connections have to be made in difficultly accessible locations or under flooded conditions.

Several techniques have been developed for joining plastic pipes to containers, which may be either plastic or nonplastic, under difficult conditions. These methods generally rely on the plastic memory of the plastic pipe. In general, the diameter of an end portion of a plastic pipe is reduced in a cold condition and the thus reduced end portion is inserted through a hole in the wall of a container. The plastic memory of the plastic pipe causes the pipe to expand which results in a tight connection between the pipe and the wall of the container.

While this method of connecting a plastic pipe to a container provides an excellent connection, in general the plastic pipe extends through the wall of the container and into the interior of the container. Where the container is a larger pipe, it may be particularly undesirable for the connecting pipe to extend into the flow path of the material flowing through the larger pipe.

It is thus an object of this invention to provide a connection between a first pipe and a container such as a larger pipe, tank or other vessel, wherein the transverse surface of the connected end of the first pipe is substantially flush with the inside surface of the portion of the wall of the container to which the first pipe is connected. It is also an object of this invention to provide a method for making a connection between a first pipe and a container such as a larger pipe, tank or other vessel, wherein the transverse surface of the first pipe is substantially flush with the inside surface of the portion of the wall of the container to which the first pipe is connected.

In accordance with the present invention, a pipe connection is formed between a first pipe and a container such as a larger pipe, tank or other vessel by cold swaging one end of the first pipe, to decrease the diameter of the end portion of the first pipe to a diameter which is smaller than the original diameter of the first pipe. Preferably, the end portion of the first pipe is flared outwardly to a diameter greater than the original diameter of the first pipe prior to the cold swaging step. A hole is cut in the wall of the container which is smaller than the original diameter of the first pipe but generally larger than the swaged diameter of the end portion of the first pipe. The diameter of the hole in the wall of the container is increased by distorting the walls of the hole outwardly from the inside of the container until the diameter of the hole in the wall of the container is greater than the largest diameter of the swaged end portion of the first pipe which must be inserted into the hole in the wall of the container. Preferably, a rubber O-ring or plastic sealing material is placed around the swaged end portion of the first pipe. The swaged end portion of the first pipe is then inserted into the hole in the wall of the container while the hole in the wall of the container is in an expanded condition. The insertion depth is controlled in such a manner that the transverse surface of the end of the first pipe being inserted is substantially flush with the inside surface of the portion of the wall of the container in which the hole was cut. The plastic memory of the wall of the container causes the diameter of the hole in the wall of the container to decrease while the plastic memory of the connected end portion of the first pipe causes the diameter of the connected end portion of the first pipe to increase thus forming a tight connection between the first pipe and the container. A pipe connection is thus formed between a first pipe and a container such as a larger pipe, tank or other vessel, wherein the transverse surface of the end portion of the first pipe, which is inserted into the container, is substantially flush with the inside surface of the portion of the wall of the container to which the first pipe is connected.

Other objects and advantages of the invention will be apparent from the foregoing brief description of the invention and from the claims as well as from the detailed description of the drawings in which:

The invention is primarily applicable to the connection of a first pipe to a larger pipe and thus the invention is described in terms of this type of connection. However, as has been previously noted, the invention is applicable to a pipe connection between a first pipe and other types of containers such as tanks or other vessels. The portion of the wall of the larger pipe to which the first pipe is joined must be formed from a plastic material which has a plastic memory. Also, the connected end portion of the first pipe must also be formed from a plastic material which has a plastic memory. The plastic material from which the portion of the wall of the larger pipe to which the first pipe is joined and the connected end portion of the first pipe may be formed from the same plastic material but this is not required. In general, both the first pipe and the larger pipe will be formed completely from a plastic material which has a plastic memory but this is not required. The term plastic memory generally refers to the characteristic of a plastic which enables the plastic to return to its original shape if the plastic is deformed in a cold state.

Any suitable plastic material which has a plastic memory may be utilized. Preferably, the plastic material having a plastic memory is formed from polymers of ethylene or copolymers of ethylene and a small quantity of other mono-1-olefins having 3 to 8 carbon atoms per molecule; said polymers having a weight average molecular weight of about 200,000 to about 1,000,000, and preferably between 250,000 and 500,000. The preferred copolymers of ethylene and a small quantity of mono-1-olefins having 3 to 8 carbon atoms, particularly copolymers of about 95 weight percent ethylene and about 5 weight percent butene-1, have a density between 0.940 and 0.965 gram/cc (ASTM D-1505-68) and a melt index of 1.0 to 2.5 grams per 10 minutes (HLMI, ASTM D-1238-70, Condition F). In addition, the plastic material may contain conventional additives such as antioxidants, fillers, pigments, and the like. In the presently preferred embodiment, the plastic material contains about 2 to about 3 weight percent based on the weight of the plastic material of carbon black. In addition about 0.05 to about 0.2 weight percent based on the weight of the plastic material of glycerine or ethylene glycol can be added as a processing aid. It is presently preferred to use a plastic pipe consisting essentially of a copolymer of about 90 to 98 weight percent of ethylene and about 10 to about 2 weight percent of butene-1 based on the weight of the copolymer plus any desired additives.

Figure 1:
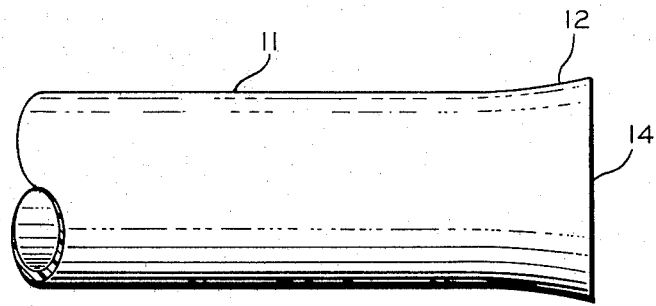
FIG. 1 is an illustration of a pipe having a flared end portion.

Referring now to the drawings, and in particular to FIG. 1, there is illustrated a generally cylindrical pipe 11 having an outwardly flared end portion 12. The flared end portion 12 of the pipe 11 may be formed by any conventional method. Generally, the outward flare is accomplished by heating the end portion of the pipe 11 above the softening point of the pipe material and then pushing the end portion of the pipe 11 over a mandrel that expands the end of the pipe. While the pipe is still on the mandrel, the pipe is cooled so that the pipe will retain its flared configuration. Use of a pipe having a flared end portion is not required but is preferred to form a tight pipe connection. The pipe 11 may be flared to any suitable proportions. Generally, the transverse end surface 14 will have an outside diameter which is up to about 15 percent greater than the outside diameter of the unflared portion of the pipe 11.

Figure 2:
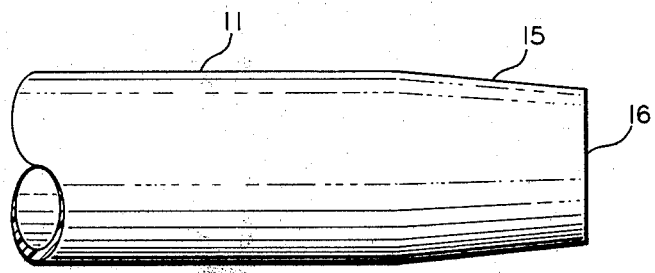
FIG. 2 is an illustration of the pipe of FIG. 1 wherein the flared end portion is cold swaged.

Referring now to FIG. 2, the pipe 11 of FIG. 1 is illustrated having an end portion 15 which has a smaller outside diameter than the outside diameter of the main portion of the pipe 11. The end portion 15 is preferably formed by inserting the flared end portion 12, illustrated in FIG. 1, into a swaging die by means of a hydraulic ram to thereby decrease the diameter of the flared end portion 12. This process is referred to as "cold swaging" because the reduction in the diameter of the end portion 15 of the pipe 11 is accomplished without softening the plastic pipe 11 by external heat. The end portion 15 of the pipe 11 is thereby deformed without removal of any material. After removal of the pipe end from the die, the cold swaged end 15 will begin to recover towards its original configuration illustrated in FIG. 1 because of the plastic memory of the plastic pipe 11. The end portion 15 of the pipe 11 may be distorted to any suitable degree by cold swaging. Generally, the transverse face 16 of the cold swaged end 15 will have an outside diameter which is in the range of about 5 to about 15 percent smaller than the outside diameter of the unswaged portion of pipe 11.

Figure 3:
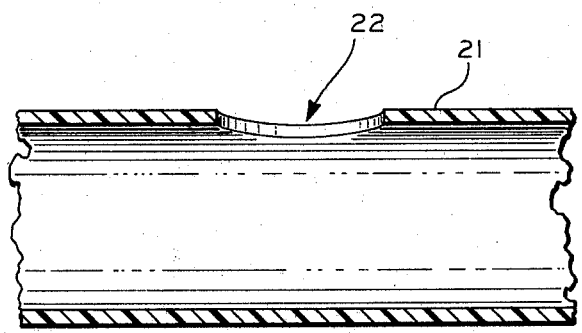
FIG. 3 is an illustration of a container having a hole in the wall thereof.

A pipe 21 which has a larger outside diameter than the outside diameter of the main portion of the portion of the pipe 11 is illustrated in FIG. 3. A hole 22 is cut in the wall of the pipe 21 either before the end portion of the pipe 11 is inserted into the swaging die or while the end portion of the pipe 11 remains in the swaging die.

The hole 22 may have any suitable diameter. The hole 22 will generally have a diameter which is less than the outside diameter of the main portion of the pipe 11 but greater than the outside diameter of the transverse face 16 illustrated in FIG. 2.

Figure 4:
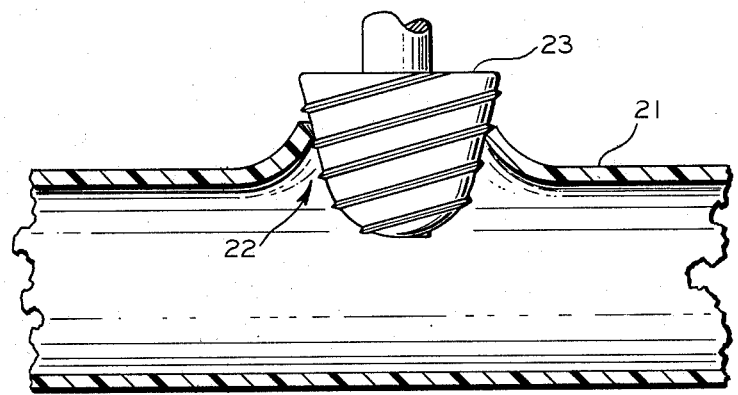
FIG. 4 is an illustration of the expanding of the hole in the wall of the container of FIG. 3.

As is illustrated in FIG. 4, a tapered plug type drill 23 is utilized to increase the diameter of the hole 22 by distorting the portion of the sidewall of the pipe 21 which surrounds the hole 22 outwardly away from the inside of the pipe 21. The tapered plug type drill 23 has threads thereon so that as the tapered plug type drill 23 is rotated into the hole 22, the surrounding edge portion of the hole 22 distorts upwardly around the tapered plug type drill 23 until the diameter of the hole 22 reaches a dimension which is greater than the largest diameter of the cold swaged end 15 of the pipe 11 which must be inserted into the hole 22. In general, the diameter of the expanded hole 22 will be greater than the diameter of the transverse surface 16, illustrated in FIG. 2, but less than the outside diameter of the main portion of the pipe 11.

Figure 5:
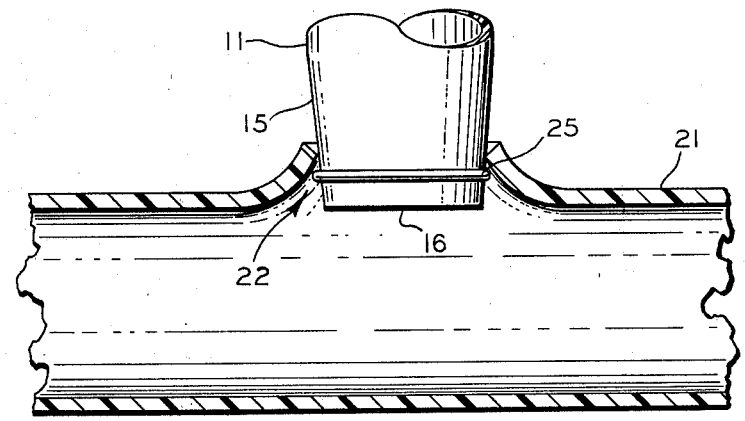
FIG. 5 is an illustration of the insertion of the pipe into the expanded hole of the container.

The tapered plug type drill 23 is removed from the hole 22 in the pipe 21 when the hole 22 has reached a desired diameter. While the hole 22 in the pipe 21 is still in an expanded condition, the inwardly tapered end portion 15 of the pipe 11 is inserted into the expanded hole 22 as is illustrated in FIG. 5. Preferably, the tapered end portion 15 of the pipe 11 is coated with any suitable plastic sealing material or a rubber O-ring 25 is placed around the tapered end portion 15 of the pipe 11. The depth of the insertion of the pipe 11 is controlled in such a manner that the transverse face 16 is substantially flush with the inside surface of the portion of the wall of the pipe 21 which is substantially adjacent the hole 22. The insertion depth will generally be controlled by simply marking the desired insertion depth on the end portion of the pipe 11 and manually or mechanically holding the pipe 11 at the desired insertion depth.

Figure 6:
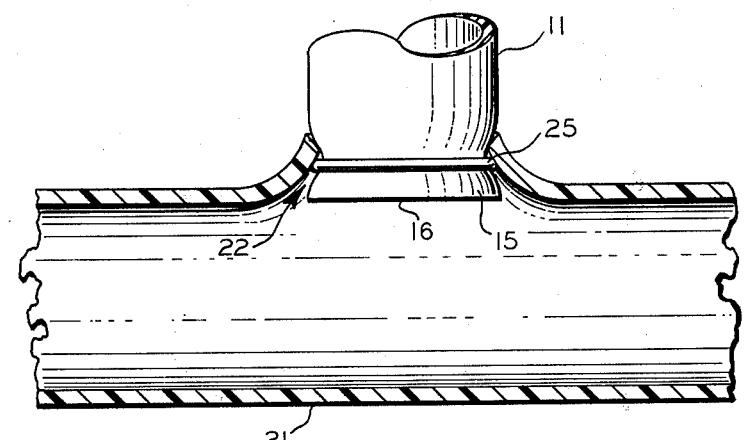
FIG. 6 is an illustration of the finished pipe connection.

Because both the expansion of the hole 22 in the pipe 21 and the swaging of the flared end portion 12 of the pipe 11 to form the reduced end portion 15 are accomplished without the addition of heat to soften the plastic, the plastic memory of the plastic material from which at least the reduced end portion 15 of the pipe 11 and the wall of the container surrounding the hole 22 are formed will cause the expanded hole 22 to reduce in diameter while the reduced end portion 15 will have a tendency to increase in diameter. The flared end portion 12 of the pipe 11 is under a stress pressing towards the wall of the container adjacent the hole while the portion of the wall of the container which is adjacent the hole is under a stress pressing towards the flared end portion 12 of the pipe 11. This dual stress causes a tight connection to be formed between the pipe 11 and the pipe 22. The finished pipe connection is illustrated in FIG. 6. The finished pipe connection is very strong and is virtually water tight. In addition, the transverse face 16 does not extend into the flow path of materials flowing through the pipe 21.

While the invention has been described in terms of the presently preferred embodiment, reasonable variations and modifications are possible by those skilled in the art, within the scope of the described invention and the appended claims.

That which is claimed is:

1. A method for connecting a first end of a first pipe to a container in such a manner that the transverse surface of the first end of said first pipe is substantially flush with the inside surface of the portion of the wall of said container to which the first end of said first pipe is connected, wherein at least the first end portion of said first pipe which is connected to said container and at least the portion of the wall of said container to which the first end portion of said first pipe is connected comprises a synthetic thermoplastic polymeric material which has a plastic memory, said method comprising the steps of:

cold-swaging the first end portion of said first pipe to form an inwardly tapered first end portion of said first pipe;

forming a hole in said wall of said container which is smaller than but similar to the outside configuration of the untapered portion of said first pipe;

cold expanding the portion of the wall of said container which is adjacent said hole in such a manner that the wall of said container adjacent said hole extends outwardly from the remaining portion of said container to form an expanded hole in said wall of said container which is larger than but similar to the outside configuration of the largest portion of the inwardly tapered first end portion of said first pipe which must be inserted into the expanded hole in said wall of said container;

inserting the inwardly tapered first end portion of said first pipe into the expanded hole in said wall of said container in such a manner that the transverse surface of the inwardly tapered first end portion of said first pipe is substantially flush with the inside surface of the portion of the wall of said container which is substantially adjacent said hole, the plastic memory of at least the first end portion of said first pipe which is connected to said container causing the inwardly tapered first end portion of said first pipe to expand and the plastic memory of at least the portion of said wall of said container to which the first end portion of said first pipe is connected causing the expanded hole in the wall of said container to contract, thus forming a connection between said first pipe and said container wherein the transverse surface of the first end portion of said first pipe which extends through the hole in said wall of said container is substantially flush with the inside surface of the portion of the wall of said container which is substantially adjacent said hole and wherein the plastic memory of said synthetic thermoplastic polymeric material causes the formation of said connection without the necessity of applying other forces to said synthetic thermoplastic polymeric material.

2. A method in accordance with claim 1 wherein said synthetic thermoplastic polymeric material comprises a polymer selected from the group consisting of polymers of ethylene and copolymers of ethylene and at least one mono-1-olefin having 3 to 8 carbon atoms per molecule, said polymer having a weight average molecular weight in the range of about 200,000 to about 1,000,000.

3. A method in accordance with claim 1 wherein said container is a second pipe which has a larger outside diameter than the outside diameter of the untapered portion of said first pipe.

4. A method in accordance with claim 1 additionally comprising the steps of:

heating the first end portion of said first pipe to a softened condition;

flaring the first end portion of said first pipe; and cooling the first end portion of said first pipe in the flared condition, said steps of heating, flaring and cooling being accomplished prior to the step of cold-swaging the first end portion of said first pipe.

5. A method in accordance with claim 4 additionally comprising the step of applying a sealing material to at least a portion of the inwardly tapered first end portion of said first pipe prior to the insertion of the inwardly tapered first end portion of said first pipe into the expanded hole in said wall of said container.

* * * * *